April 13, 1965   J. C. NEITZEL ETAL   3,177,529
GIN ROLL DENSITY CONTROL

Filed July 26, 1962   3 Sheets-Sheet 1

Joseph C. Neitzel
James A. Nelson
INVENTORS

BY Bertram H. Mann
ATTORNEY

April 13, 1965  J. C. NEITZEL ETAL  3,177,529
GIN ROLL DENSITY CONTROL
Filed July 26, 1962  3 Sheets-Sheet 3

Joseph C. Neitzel
James A. Nelson
INVENTORS

BY Bertram H. Mann
ATTORNEY

United States Patent Office 3,177,529
Patented Apr. 13, 1965

3,177,529
GIN ROLL DENSITY CONTROL
Joseph C. Neitzel and James A. Nelson, Dallas, Tex., assignors to The Murray Company of Texas, Inc., Dallas, Tex., a corporation of Delaware
Filed July 26, 1962, Ser. No. 212,585
3 Claims. (Cl. 19—64.5)

This invention relates to cotton gin and feeder assemblies and consists particularly in novel means for automatically maintaining the seed roll of the gin at optimum density.

The usual saw type cotton gin is provided with a seed roll chamber adjacent the ginning saws and just anterior to the ginning ribs wherein a mass of variously ginned seed cotton and seeds is caused to rotate so as to be repeatedly exposed to the saw teeth. The ideal condition for ginning is to have what is called a loose roll within the seed roll chamber and the compactness of the roll may be controlled through adjustment, either manual or automatic, of the feed rollers in the top of the feeder above the gin. Some approaches to the achievement of desired seed roll density have been suggested, for instance, involving density and torque sensing devices located in the seed roll chamber, but such means heretofore devised have not been particularly accurate or successful and, in addition, tend to adversely affect the functioning of the roll.

Accordingly, it is an object of the present invention to provide novel, automatic means for maintaining optimum density of the gin seed roll.

Another object is to provide novel means for sensitively detecting abnormal or subnormal density of the seed roll and utilizing the signal so created for adjusting the speed of the feeder rolls so as to maintain the seed roll at the proper density.

A more detailed object is to utilize variations in the current drawn by the gin and feeder operating motor, which may result from variations in feed roll density, for adjusting the feeder rate so as to maintain the seed roll at the optimum density.

In the herein-disclosed apparatus for achieving these objects there is provided a commercial gin and feeder combination in which the gin has ginning saws and an adjacent seed roll chamber. The feeder rollers are hydraulically powered and the powering mechanism is provided with control valving for adjusting the rate of rotation of these rollers and, therefore, the rate of supply of seed cotton to the gin therebelow. The hydraulic power control valve means is, in turn, controlled either manually or by motor means whose extent and direction of movement are determined by variations in current drawn by the gin and feeder operating motor. Thus, no seed roll density sensing means need be provided in the seed roll chamber itself.

In the accompanying drawings which illustrate the invention,

Figure 1:
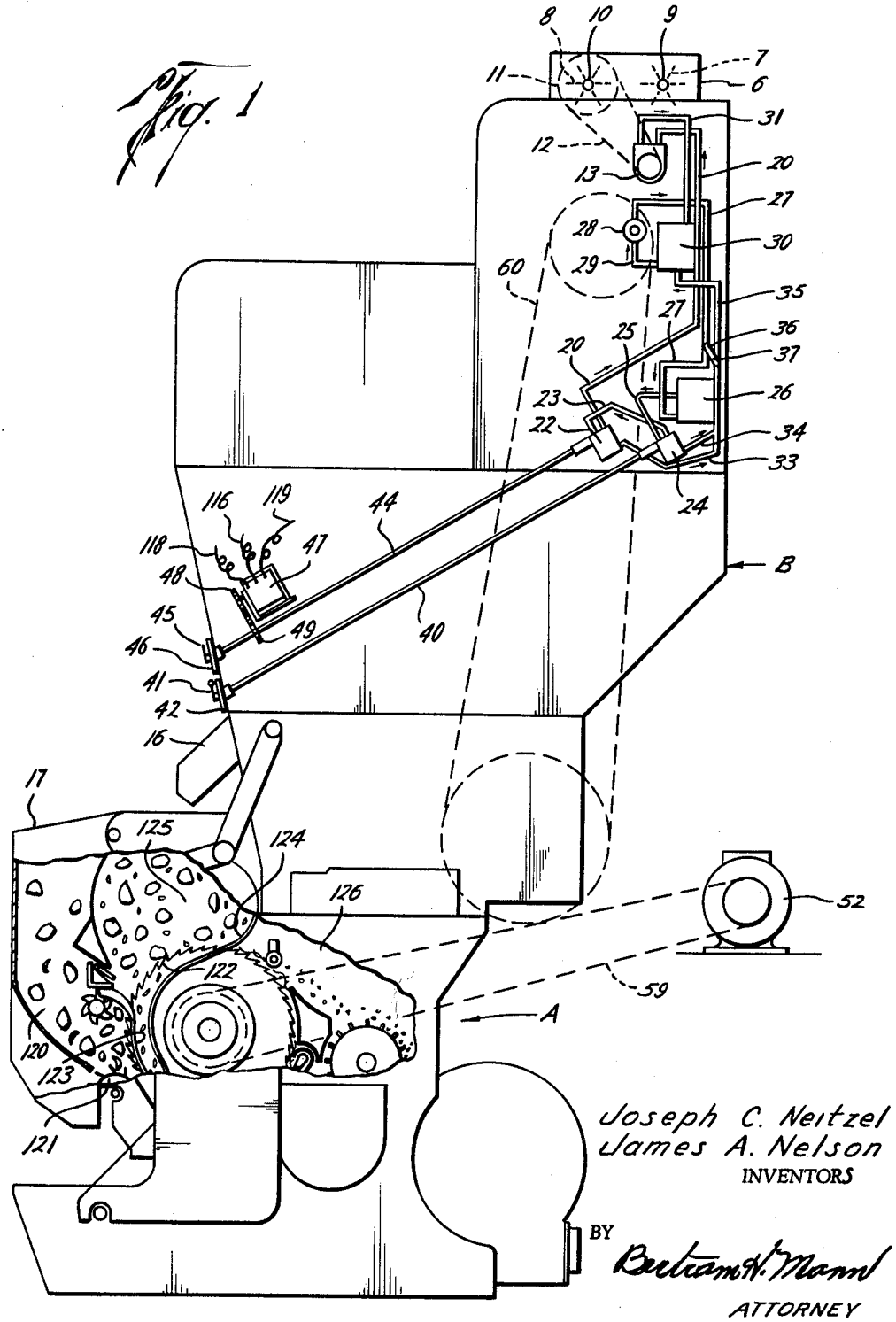
FIG. 1 is a side view of a gin and feeder combination, portions of the gin stand side wall being broken away to illustrate the underlying operating parts.

FIG. 1 shows a gin stand, generally designated A, and a feeder mounted thereabove, generally designated B. The feeder has an inlet opening 6 at the top in which are rotatably mounted feed rollers 7 and 8 on shafts 9 and 10. Shaft 10 is provided with a sprocket wheel 11 driven by a chain 12 from an hydraulic motor 13. Feed roller shafts 9 and 10 are geared together for joint operation. At the lower end of the feeder B there is provided a trough 16 which directs cotton into the open top of the gin front 17.

Figure 2:
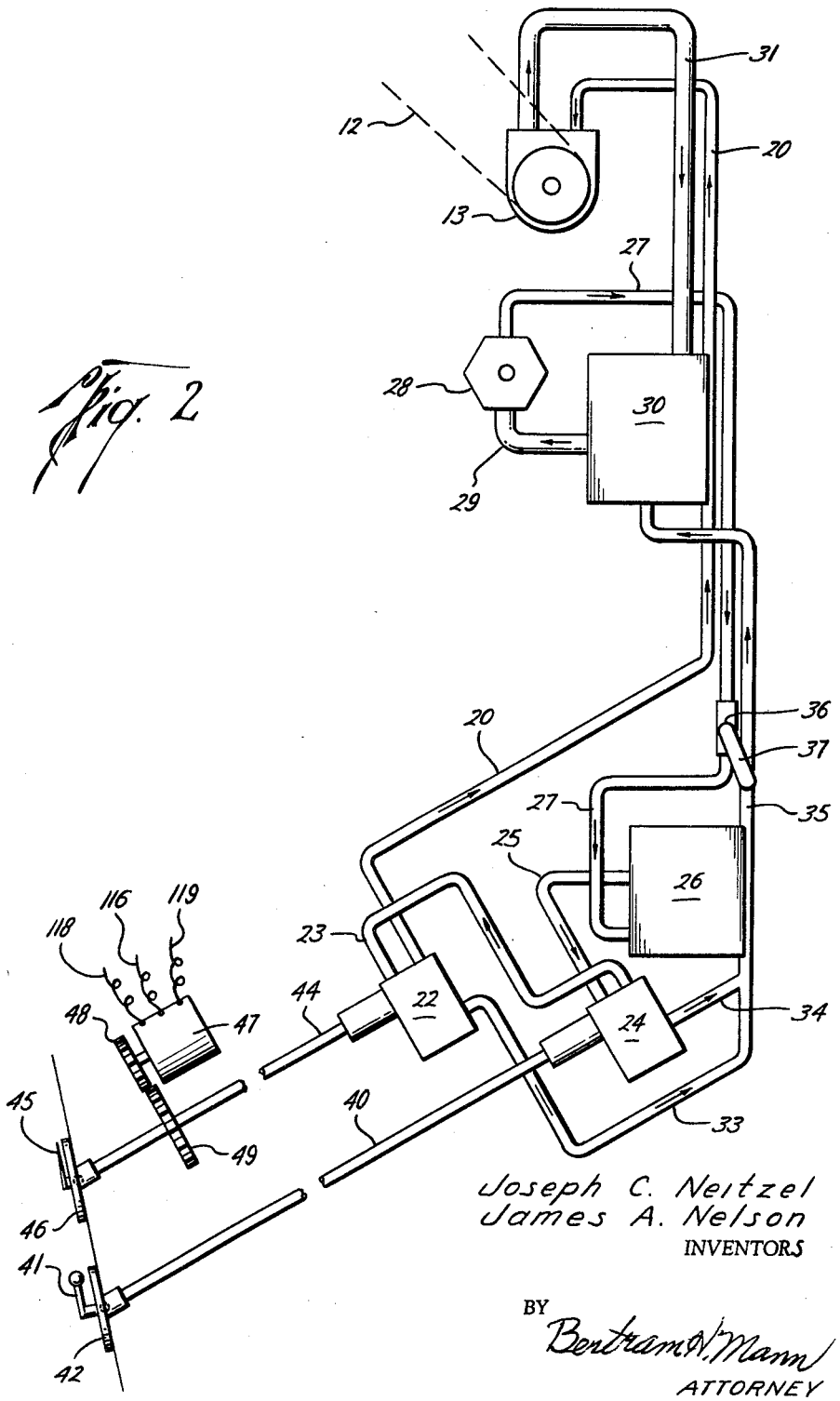
FIG. 2 is a schematic representation of the hydraulic powering and control means for the feeder rollers.

As best seen in FIG. 2, hydraulic motor 13, which drives feeder rolls 7 and 8, receives pressured fluid through a pipe 20 leading from an automatic valve 22 and through a pipe 23 from a manual valve 24. Pressured fluid is supplied to the manual valve through a pipe 25 which communicates through a solenoid valve 26 with a pipe 27 which is connected to the discharge side of a hydraulic pump 28. Solenoid valve 26 serves to cut off the supply of hydraulic fluid to motor 13, after a time interval, when the gin front is opened, as explained in Day Patent No. 2,962,769. The inlet side of pump 28 is connected by a pipe 29 to an oil reservoir 30. The discharge from fluid motor 13 is returned through a pipe 31 to reservoir 30. Both manual valve 24 and automatic valve 22 are of the by-pass type in which varying quantities of working fluid are by-passed to the oil reservoir. Thus, a by-pass pipe 33 extends from automatic valve 22 and a by-pass pipe 34 extends from manual valve 24, both by-pass lines connecting with the reservoir through a common return pipe 35. A pressure regulating relief valve 36 provided in pump discharge line 27 also is connected to return line 35 by means of a short tube 37.

Manual hydraulic control valve 24 is itself controlled by a shaft 40 which projects along the side wall and beyond the front wall of the feeder and is there provided with an operating handle 41. Rotation of the handle with respect to indexed face 42 varies the proportion of hydraulic fluid which is by-passed from manual valve 24 and, therefore, the rotational and feeding rate of rollers 7 and 8.

Automatic valve 22, with which the present invention is more particularly concerned, is controlled by a shaft 44 which also projects through the front wall of the feeder where it is provided with a needle 45 which, by relation to index disk 46, indicates the condition of the valve. Shaft 44 may be rotated by means of a small electric motor 47 acting through gears or sprockets 48 and 49. Since the automatic and manual valves are connected in series in the hydraulic pressure line between the pump and motor, the one of these valves which constitutes an effective restriction in the hydraulic line will be in control.

Figure 3:
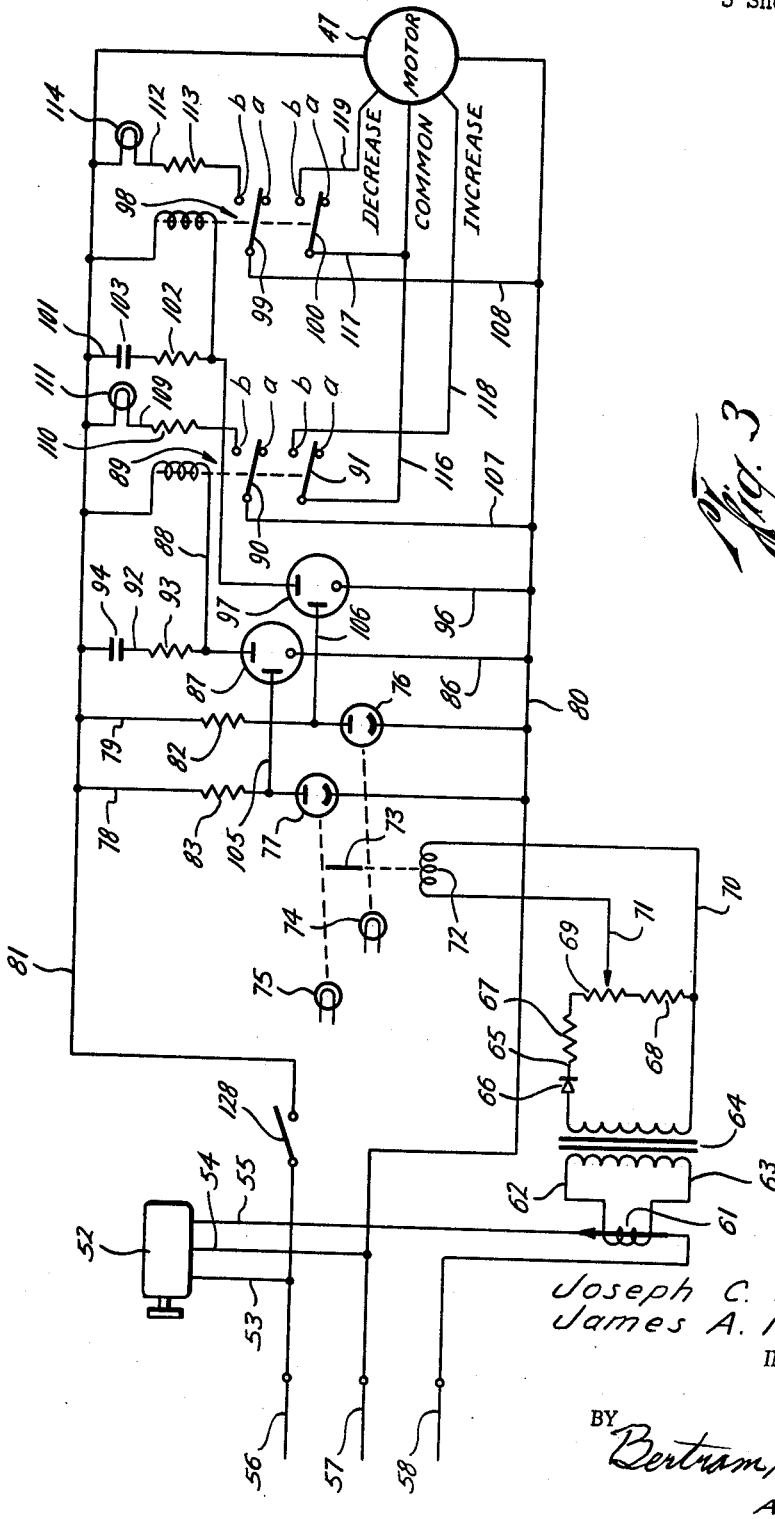
FIG. 3 is a wiring diagram of the adjusting means for the feed rollers.

Referring to the wiring diagram, FIG. 3, there is shown the main gin and feeder control motor 52 which is connected by wires 53, 54 and 55 to the legs 56, 57 and 58 of a three-phase power line. FIG. 1 shows motor 52 connected to the gin stand by a belt 59. Feeder pump 13 is powered from the gin stand through suitable gears and belting, shown in part at 60 so that both the gin stand and feeder are driven by motor 52.

Again referring to FIG. 3, one leg 58 of the power source passes through a current transformer 61 from which the induced current is led through wires 62 and 63 through the primary of a voltage transformer 64. One side of the secondary of transformer 64 is connected by a wire 65 leading through a diode rectifier 66, resistances 67 and 68 and a potentiometer 69 to a wire 70 leading to the other side of the transformer secondary. The take-off wire 71 from the potentiometer leads through the actuating coil 72 of a shading meter relay and thence to wire 70. The shading meter pointer 73, normally, is located between the beams cast by two light sources 74 and 75 in the directions, respectively, of photoelectric elements, conventionally represented at 76 and 77. These elements are of the type which embody greater resistance to the passage of electrical current therethrough when they are shaded than when they are illuminated.

A pair of lines 78 and 79 extend across two of the power leads 80 and 81, and each includes one of the cells 76 or 77 and a resistance 82 or 83. Also connected across power leads 80 and 81 is a first tube circuit including a wire 86, a three electrode thermionic gas control tube 87, a wire 88, and the actuating coil of a relay 89 having a pair of poles 90 and 91. Each pole has a pair of contacts, designated, respectively, *a*, the normally closed contact, and *b*, the normally open contact. A circuit including wire 92, a resistance 93, and a condenser 94 parallels the coil of relay 89 to prevent chattering of the relay under the influence of the pulsating current passed by the tube.

A second tube circuit between power lines 80 and 81 includes a wire 96, a gas control tube 97, and the actuating coil of a relay 98 having a pair of poles 99 and 100. Each of these poles has a pair of contacts designated *a*, the normally closed contact, and *b*, the normally open contact. A chatter-preventing circuit including wire 101, resistor 102, and condenser 103 is also provided as shown.

The control grids of tubes 87 and 97 are connected by wires 105 and 106, respectively, to leads 78 and 79 containing the photoelectric cells 77 and 76. The relay poles 90 and 99 are connected, respectively, by wires 107 and 108 to power lead 80. Normally open relay contact 90*b* is connected by a circuit wire 109, containing a resistor 110 and a signal lamp 111, to power lead 81. Normally open relay contact 99*b* is similarly connected to power lead 81 by a circuit wire 112 containing a resistor 113 and a signal lamp 114.

Relay poles 91 and 100 are both connected by wires 116 and 117 to the common terminal of automatic valve control motor 47. Normally open relay contact 91*b* is connected by a wire 118 to one directional terminal of motor 47, while normally open relay contact 100*b* is connected by a wire 119 to the opposite directional terminal of feeder control valve motor 47.

With further reference to FIG. 1, the gin front 17 is shown as forming a chute 120 through which cotton passes from the feeder to a picker roll 121 which directs incoming seed cotton against the teeth of ginning saws 122. This seed cotton is then drawn between huller ribs 123 for the extraction of hulls and coarse trash which drop through the bottom of chute 120. The cotton is then carried around by the saw teeth striking ginning ribs 124 which, being more closely spaced than the huller ribs, tend to pull the lint from the seeds. A mass of partially ginned cotton and seeds accumulates in seed roll chamber 125 adjacent the saws and rotates therein to repeatedly expose the cotton therein to the action of the saw teeth and ginning ribs. Moting is extracted from the ginned cotton in the portion 126 of the stand, while the cleaned lint is doffed from the saw teeth in any suitable manner.

As previously explained, the efficiency of the gin depends upon the continued rotation of the seed roll and the maintenance of the roll at optimum density. If the density of the seed roll decreases, the current drawn by gin powering motor 52 tends to decrease, while if the density of the seed roll increases, the load on motor 52 and, accordingly, the current drawn thereby tend to increase. It is this latter relationship which is utilized by means of the control circuitry illustrated in FIG. 3 and the feed roller powering means illustrated in FIGS. 1 and 2 for adjusting the feed to the gin front chute and, thereby, the density of cotton in the seed roll, if automatic circuit switch 128 is closed.

In operation of the device, the rate of rotation of rolls 7 and 8 can be manually controlled by means of valve control 40, 41 to control the feeding rate if automatic valve 22 is fully opened and master switch 128 is open. Upon closing of the master switch and full opening of manual valve 24, the apparatus will operate automatically to maintain optimum density of the seed roll. At such time, any variation in the current drawn by gin and feeder driving motor 52 will be reflected in the current induced by inductive element of the current transformer 61, which current, rectified by diode 66 and adjusted by means of potentiometer 69, is applied to shading meter relay coil 72. The potentiometer is adjusted so that under optimum operating conditions, shading pointer 73 will be located between and so as to clear the beams from lamps 74 and 75. Under this condition, photoelectric elements 76 and 77 will be illuminated by the lamp beams, and the resistance in and, therefore, the voltage across tubes 77 and 76 will be minimum. These voltage conditions, in turn, applied to the control grids of tubes 87 and 97, will result in appropriate voltage differential between the cathodes and grids to render the tubes non-conducting.

However, should the load on motor 52 decrease, as would occur upon a substantial decrease in density of the feed roll in the gin stand, the current applied to circuits 64, 65, 71, etc. will decrease and shading pointer 73 will be deflected so as to interfere with the beam cast upon photoelectric element 77. This will result in increased resistance across cell 77 and increased voltage difference between the cathode and grid of tube 87, whereupon this tube conducts. The current thus passed through tube 87 will act upon the coil of relay 89 causing its poles 90 and 91 to pick up. Condenser-resistor circuit 92 serves to increase the duration of the coil energizing pulse to maintain the relay coil energized.

Upper relay contact 90*b*, now powered, illuminates lamp 111 to indicate the controlling function. Relay terminal 91*b* then serves to connect the common of motor 47 to one of the directional terminals which serves to rotate control motor 47 and shaft 44 in the direction to reduce the rate of by-pass from automatic valve 22 and, therefore, to increase the speed of fluid motor 13 and feed rollers 7 and 8. This will, in turn, increase the quantity of cotton delivered to the gin and, correspondingly, increase the density of material within the seed roll chamber 125. This action will continue until the load on motor 52 increases to normal, whereupon tube 87 becomes non-conducting and relay 89 drops. Automatic hydraulic valve 22 is capable of completely cutting off by-pass 33, if the control motor 40 continues to run, to produce maximum speed of the feed rollers.

Should the density of cotton in the seed roll chamber increase excessively, the load on and, therefore, the current drawn by motor 52 will increase. This increase, reflected through circuits 64, 65, 71, etc., will cause shading pointer 73 to be deflected in the direction for interfering with the beam cast toward the other photoelectric element 76. Thereupon, the resistance in and the voltage drop across cell 76 will be increased, which will cause tube 97 to conduct applying energy to the coil of relay 98. Relay terminal 99*b* will be energized so as to light lamp 114, indicating the control function underway, while relay pole 100 will connect the common of control motor 47 through terminal 100*b* to the other directional terminal of motor 47. This will cause motor 47 and shaft 44 to rotate in the direction for increasing the fluid by-passed by automatic valve 22 and, thereby, will decrease the speed of fluid motor 13 and feed rollers 7 and 8. Thus, the quantity of cotton delivered to the gin stand will be reduced, permitting the excess material in feed roll chamber 125 to be reduced by ginning action. If necessary, all hydraulic fluid will be by-passed from automatic valve 22 and the feed rollers stopped.

The above-described control has been found to be very sensitive to density variations in the seed roll chamber, and effective in correcting them. Thus, if potentiometer 69 is adjusted so that the shading pointer will clear the photoelectric cells 76 and 77 when the gin is operating properly, an abnormal variation of the density in the seed roll chamber will result in corrective action, as explained.

Other feeder powering means, for instance, an electric motor with suitable controls, may be substituted for hydraulic motor 13 and its control valves 22, 24, and 26. Also, shading meters 72, 73, cells 76 and 77, and tubes 97 and 87, though exemplary, may be replaced by other means sensitive and responsive to variations in current flow to main motor 52 for adjusting feeder control 22. The invention may be modified in various respects as will occur to those skilled in the art, and the exclusive use of all modifications as come within the scope of the appended claims is contemplated.

We claim:

1. In combination with a cotton gin comprising a ginning cylinder and a seed roll chamber, a first motor for driving said cylinder and causing rotation of seed cotton in said chamber, a first powering circuit for said motor, a feeder for said gin having rotatable rolls for controlling the feeding rate thereof, and a second motor for driving said feeder rolls; the improvement comprising, speed control means for said second motor, a third motor operatively connected to said speed control means for actuating the same, current flow sensing means electrically coupled to said first powering circuit and sensitive to variation of current flow therein resulting from variation in torque required to drive said cylinder due to changes in density of seed cotton in said chamber, second and third powering circuits for energizing said third motor in opposite directions for selectively increasing and decreasing the speed of said second motor and said feeder rolls, relay means in each of said second and third circuits, and relay control connections between each of said relay means and said current sensing means, said relay control connections having instrumentalities responsive to said current sensing means for actuating said relay means, respectively, upon underloading and overloading of said first motor to increase and decrease the speed of said second motor and said feeder rolls.

2. The combination described in claim 1 in which said relay control connections each comprises a light sensitive resistance, means to cast a light beam toward each of said resistances, shading means for said beams, and means operatively connecting said shading means and said current sensing means for adjusting said shading means to clear both of said beams under predetermined current flow to said first motor and to shade, respectively, one or the other of said beams to vary one of said resistances and thereby energize the corresponding one of said control connections.

3. The combination described in claim 1 in which said relay control connections each comprises a thermionic tube having a plate, a cathode, and a grid, a power circuit for the cathode and plate of each tube, a control grid circuit for each tube paralleling the corresponding tube power circuit, a light sensitive resistance in each grid circuit, light source means casting an individual beam toward each of said resistances, light shading means, and means operatively connecting said shading means and said current sensing means for positioning said shading means to uniformly affect both of said beams under conditions of optimum current flow to said first motor and to shift said shading means to vary one of said resistances upon variation of current flow in said first powering circuit and thereby cause one of said tubes to conduct, to energize one of said relays, and to actuate said third motor in one direction.

References Cited by the Examiner
UNITED STATES PATENTS

| | | | |
|---|---|---|---|
| 2,336,434 | 12/43 | Wurzbach | 198—37 X |
| 3,005,540 | 10/61 | Hinderaker | 198—232 |
| 3,032,830 | 5/62 | Van Dooran et al. | 19—55 X |

DONALD W. PARKER, *Primary Examiner.*